(12) United States Patent
Anschutz

(10) Patent No.: US 10,530,682 B2
(45) Date of Patent: *Jan. 7, 2020

(54) PROVIDING DIFFERENTIATED SERVICE TO TRAFFIC FLOWS OBSCURED BY CONTENT DISTRIBUTION SYSTEMS

(71) Applicant: AT&T INTELLECTUAL PROPERTY I, L.P., Atlanta, GA (US)

(72) Inventor: Thomas A. Anschutz, Conyers, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 287 days.

This patent is subject to a terminal disclaimer.

(21) Appl. No.: 15/625,484

(22) Filed: Jun. 16, 2017

(65) Prior Publication Data

US 2017/0289049 A1 Oct. 5, 2017

Related U.S. Application Data

(63) Continuation of application No. 15/044,699, filed on Feb. 16, 2016, now Pat. No. 9,699,094, which is a
(Continued)

(51) Int. Cl.
*G06F 15/173* (2006.01)
*H04L 12/725* (2013.01)
(Continued)

(52) U.S. Cl.
CPC .......... *H04L 45/306* (2013.01); *H04L 45/308* (2013.01); *H04L 45/38* (2013.01);
(Continued)

(58) Field of Classification Search
CPC . H04L 12/2801; H04L 41/0893; H04L 43/00; H04L 61/1511; H04L 12/4641
See application file for complete search history.

(56) References Cited

U.S. PATENT DOCUMENTS 6,006,264 A 12/1999 Colby et al.
6,898,641 B1 5/2005 Kobayashi
(Continued)

FOREIGN PATENT DOCUMENTS

EP 0982909 3/2000

OTHER PUBLICATIONS

Jiang et al., "A Framework for Semantic IPv6 Prefix and Gap Analysis," http://tools.ietf.org/html/draft-jiang-semantic-prefix-04, pp. 1-16, Jan. 1, 2013.

*Primary Examiner* — Dustin Nguyen
(74) *Attorney, Agent, or Firm* — Akerman LLP; Michael K. Dixon; Mammen (Roy) P. Zachariah, Jr.

(57) ABSTRACT

A system for providing differentiated services to traffic flows of a content distribution network is disclosed. In particular, the system may include determining if a first portion of an internet protocol address associated with a traffic flow includes an identifier for a node in the content distribution network by comparing the identifier to a set of prefixes for the content distribution network. Additionally, the system may include determining if a second portion of the internet protocol address matches a unique host address specified by the content distribution network for a customer of the content distribution network. If a rule for providing a differentiated service exists for the customer, the first portion is in the set of prefixes, and the second portion matches the unique host address specified for the customer, the system may provide the differentiated service for the traffic flow.

20 Claims, 4 Drawing Sheets

Related U.S. Application Data continuation of application No. 14/020,360, filed on Sep. 6, 2013, now Pat. No. 9,319,307.

(51) Int. Cl.
*H04L 12/721* (2013.01)
*H04L 12/851* (2013.01)
*H04L 29/08* (2006.01)
*H04L 29/06* (2006.01)

(52) U.S. Cl.
CPC .......... *H04L 47/2408* (2013.01); *H04L 67/02* (2013.01); *H04L 63/101* (2013.01)

(56) References Cited

U.S. PATENT DOCUMENTS

| | | |
|---|---|---|
| 6,944,169 B1 | 9/2005 | Yoshizawa et al. |
| 7,088,718 B1 | 8/2006 | Srivastava |
| 7,508,753 B2 | 3/2009 | Greenspan et al. |
| 7,650,427 B1 | 1/2010 | Liu et al. |
| 7,904,541 B2 | 3/2011 | Swildens et al. |
| 7,958,220 B2 | 6/2011 | Ding |
| 8,078,755 B1 | 12/2011 | Liu et al. |
| 8,176,203 B1 | 5/2012 | Liu et al. |
| 8,225,399 B1 | 7/2012 | Van der Merwe |
| 8,341,295 B1 | 12/2012 | Liu et al. |
| 2002/0013844 A1* | 1/2002 | Garrett ................ H04L 12/2801 709/225 |
| 2003/0053448 A1 | 3/2003 | Craig et al. |
| 2004/0223497 A1* | 11/2004 | Sanderson .......... H04L 12/4641 370/395.52 |
| 2005/0144553 A1 | 6/2005 | Bass et al. |
| 2006/0072543 A1* | 4/2006 | Lloyd .................... H04L 43/00 370/351 |
| 2007/0127474 A1 | 6/2007 | Mirtorabi |
| 2008/0228932 A1 | 9/2008 | Monette et al. |
| 2009/0109845 A1* | 4/2009 | Andreasen .......... H04L 41/0893 370/230 |
| 2010/0002660 A1 | 1/2010 | Grayson |
| 2011/0142058 A1 | 6/2011 | Wagner |
| 2012/0314593 A1 | 12/2012 | Liu |
| 2014/0164584 A1* | 6/2014 | Joe ..................... H04L 61/1511 709/223 |

\* cited by examiner

PROVIDING DIFFERENTIATED SERVICE TO TRAFFIC FLOWS OBSCURED BY CONTENT DISTRIBUTION SYSTEMS

CROSS-REFERENCE TO RELATED APPLICATION(S)

This application is a continuation of U.S. patent application Ser. No. 15/044,699, filed on Feb. 16, 2016, now U.S. Pat. No. 9,699,094, which claims priority to and is a continuation of U.S. patent application Ser. No. 14/020,360, filed on Sep. 6, 2013, now U.S. Pat. No. 9,319,307, each of which are herein incorporated by reference in their entireties.

FIELD OF THE INVENTION

The present application relates to providing differentiated services to traffic flows in a network, and more particularly, to a system for providing differentiated services to traffic flows obscured by content distribution networks and systems.

BACKGROUND

In today's society, end users regularly utilize network and other service providers to gain access to the Internet, access software services, request and receive various types of content, place internet-based calls, and perform a variety of other tasks and functions. A company that has a large number of end users or that offers highly popular content often utilizes content distribution networks and systems to serve the company's content to such end users. This is especially true when high performance, reliability, scalability, and cost savings associated with distributing the content are important to the company. Content distribution networks often provide a wide variety of advantages to companies that utilize such networks. For example, content distribution networks offer a high level of performance because content is often cached on edge servers, and content requests from end users are typically directed to the closest or most optimal node in the content distribution network. Additionally, the company's various content assets are dynamically distributed across multiple servers in such a way that an outage in one region does not substantially affect the content distribution network's ability to continue providing content to end users. Furthermore, content distribution networks typically provide a large number of servers and other devices for delivering content, and, as a result, are more readily able to handle unpredictable surges in end users or requests for content.

Content distribution networks typically deploy server farms at peering points, and provide their services to various business customers using these same server farms. In such a model, identifying specific traffic flows that are associated with a particular business customer of the content distribution network is often difficult. This is particularly true when a single server serves many of the content distribution network's customers simultaneously. In such a scenario, packet headers may appear to be the same for all customers that are served by the server of the content distribution network. This makes it difficult to provide differentiated services to various traffic flows of customers in current content distribution networks. Currently, in order to identify a specific traffic flow associated with a specific customer, devices such as Deep Packet Inspection (DPI) devices are deployed to monitor requests for content, such as HTTP GET requests or other similar requests. As the DPI devices monitor requests for content, the DPI devices then create memory state to associate a particular monitored request to a specific flow that follows the request. Such operations performed by DPI devices, proxy devices, network address translation devices, or other similar devices are often memory intensive and highly complex. In order to incorporate such functionality, the number of devices in the content distribution network, the amount of resources spent on the content distribution network, and the complexity of the content distribution network often have to be increased substantially.

SUMMARY

A system and accompanying methods for providing differentiated services to traffic flows obscured by a content distribution network are disclosed. In particular, the system and methods may include leveraging a property of internet protocol addressing in conjunction with a content distribution network's cooperation to provide a system to identify traffic flows of specific customers of the content distribution network so as to allow a network provider to provide differentiated services to the customers of the content distribution network. Notably, traffic flows are often obscured by content distribution networks, and identifying traffic flows associated with specific customers of content distribution networks often requires the use of Deep Packet Inspection (DPI) or other similar devices, which require creating state for monitoring traffic flows and using substantial amounts of resources. The present disclosure enables the identification of traffic flows associated with specific customers of the content distribution network and the provisioning of differentiated services for such traffic flows without the need for DPI or other similar devices, and without requiring additional resources devoted to creating state for monitoring such traffic flows.

Notably, an internet protocol version 6 (IPv6) address may be composed of two parts: a route and a host. This property of IPv6 may be leveraged by the system and accompanying methods to identify specific traffic flows associated with specific customers of a content distribution network. In particular, a first portion of the address may be configured to represent a route identifier for differentiating nodes or other devices in the content distribution network. Additionally, a second portion of the address may be configured to represent a unique host address or host identifier that uniquely identifies a particular customer from other customers of the content distribution network. Instead of using the second portion of the address to identify a specific media access control address or some other arbitrary number, the second portion may effectively be utilized by the systems and methods to determine what customer a specific traffic flow is associated with based on the unique host address or host identifier specified for the customer.

When a particular traffic flow traverses a network device, such as a network provider device, the network device may determine if a first portion of an internet protocol address that is associated with the traffic flow identifies a node in the content distribution network by comparing the first portion to a set of valid prefixes for the content distribution network. Then, the network device may determine if a second portion of the internet protocol address matches a unique host address that is specified by the content distribution network for a specific customer of the content distribution network. If the first portion is in the set of valid prefixes and the second portion matches the unique host address for a customer of the content distribution network, the network device may determine if a rule for providing a differentiated service for the customer exists. If the rule exists, the network device may provide the differentiated service to all packets in the traffic flow for that customer of the content distribution network. Notably, the systems and methods may provide such differentiated services without having to link a set of packets in a particular traffic flow to a particular request for content.

In one embodiment, a system for providing differentiated services to traffic flows of a content distribution network is disclosed. The system may include a memory that stores instructions and a processor of a network provider that executes the instructions to perform various operations of the system. The processor of the system may perform an operation that includes determining an internet protocol address from which a particular traffic flow was sent. The traffic flow may be associated with a request for content. Then, the processor may perform an operation that includes determining if a first portion of the internet protocol address includes a route identifier that identifies a node in the content distribution network that provides the content. This may be performed by the processor by comparing the first portion to a set of prefixes for the content distribution network. Additionally, the processor may perform an operation that includes determining if a second portion of the internet protocol address matches a unique host address that is specified by the content distribution network for a customer of the content distribution network. Furthermore, the processor may perform an operation that includes determining if a rule for providing a differentiated service for the customer exists if the first portion of the internet protocol address is determined to be in the set of prefixes and if the second portion of the internet protocol address matches the unique host address specified by the content distribution network for the customer. The system may then provide the differentiated service for the traffic flow if the rule is determined to exist for the customer.

In another embodiment, a method for providing differentiated services to traffic flows of a content distribution network is disclosed. The method may include utilizing a memory that stores instructions, and a processor that executes the instructions to perform the various functions of the method. The method may include determining an internet protocol address from which a particular traffic flow was sent. The traffic flow may be associated with a request for content. Additionally, the method may include determining if a first portion of the internet protocol address includes a route identifier that identifies a node in the content distribution network that provides the content. This may be performed by comparing the first portion of the internet protocol address to a set of prefixes for the content distribution network. The method may also include determining if a second portion of the internet protocol address matches a unique host address that is specified by the content distribution network for a customer of the content distribution network. Furthermore, the method may include determining if a rule for providing a differentiated service for the customer exists if the first portion of the internet protocol address is determined to be in the set of prefixes and if the second portion of the internet protocol address matches the unique host address specified by the content distribution network for the customer. Moreover, the method may include providing the differentiated service for the traffic flow if the rule is determined to exist for the customer.

According to yet another embodiment, a computer-readable device having instructions for providing differentiated services to traffic flows of a content distribution network is provided. The computer instructions, which when loaded and executed by a processor, may cause the processor to perform operations including: determining an internet protocol address from which a traffic flow was sent, wherein the traffic flow is associated with a request for content; determining if a first portion of the internet protocol address includes a route identifier that identifies a node in the content distribution network that provides the content by comparing the first portion to a set of prefixes for the content distribution network; determining if a second portion of the internet protocol address matches a unique host address that is specified by the content distribution network for a customer of the content distribution network; determining if a rule for providing a differentiated service for the customer exists if the first portion of the internet protocol address is determined to be in the set of prefixes and if the second portion of the internet protocol address matches the unique host address specified by the content distribution network for the customer; and providing the differentiated service for the traffic flow if the rule is determined to exist for the customer.

These and other features of the systems and methods for providing differentiated service to traffic flows of content distribution networks are described in the following detailed description, drawings, and appended claims.

DETAILED DESCRIPTION OF THE INVENTION

Figure 1:
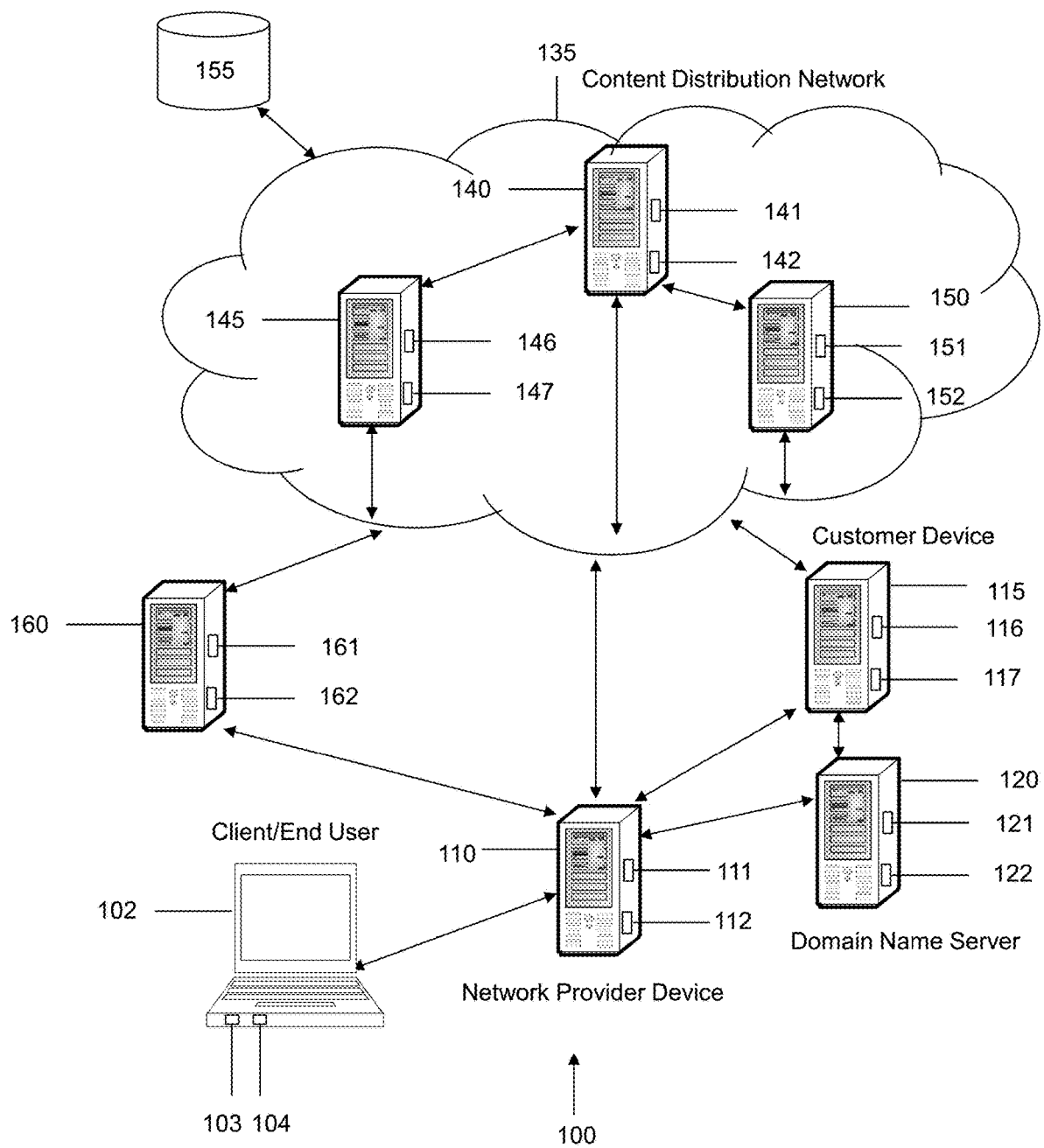
FIG. 1 is a schematic diagram of a system for providing differentiated services to traffic flows of a content distribution network according to an embodiment of the present disclosure.

A system 100 and accompanying methods for providing differentiated services to traffic flows associated with a content distribution network 135 are disclosed. The system 100 may leverage a property of internet protocol addressing in conjunction with a content distribution network's 135 cooperation to identify traffic flows that are associated with specific customers of the content distribution network 135. Notably, a network provider or other entity may identify traffic flows that are linked with specific customers of the content distribution network 135 without the need for Deep Packet Inspection (DPI) or other similar devices, without requiring additional resources devoted to creating state for monitoring such traffic flows, and without having to link a particular set of packets to a particular content request associated with the traffic flow. Once traffic flows of specific customers of the content distribution network 135 are identified, a network provider may provide differentiated services to the customer of the content distribution network 135 if a rule indicates that the customer should receive the differentiated services.

The property of internet protocol addressing that may be leveraged by the system 100 is a property of internet protocol version 6 (IPv6) addressing or other similar addressing schemes. Specifically, addresses in IPv6 are typically composed of two parts: a route and a host. However, the first route portion of the address may be reconfigured in the present disclosure to represent a route identifier for differentiating nodes or other devices in the content distribution network 135. Additionally, the second host portion of the address may be reconfigured to represent a unique host address or host identifier that uniquely identifies a particular customer from other customers of the content distribution network 135. In some traditional IPv6 applications, the second portion of an internet protocol address may be utilized to identify a specific media access control address or some other arbitrary number. By having the second portion of the address instead represent a unique host address that uniquely identifies the customer, the second portion may effectively be analyzed by the system 100 to determine which customer of the content distribution network 135 a specific traffic flow is associated with.

For example, when a particular traffic flow traverses a network device, such as network provider device 110, the network device may determine if a first portion of an internet protocol address that is associated with the traffic flow identifies a node in the content distribution network 135. This may be determined by having the network device compare the first portion of the internet protocol address to a set of valid prefixes for the content distribution network 135. Then, the network device may determine if a second portion of the internet protocol address matches a unique host address that is specified by the content distribution network 135 for a specific customer of the content distribution network 135. If the first portion is determined to be in the set of valid prefixes and the second portion matches the unique host address for a customer of the content distribution network 135, the network device may determine if a rule for providing a differentiated service for the customer exists. If the rule exists, the network device may provide the differentiated service to all packets in the traffic flow for that identified customer of the content distribution network 135.

Referring to the drawings and in particular to FIG. 1, the system 100 may provide a way to link specific content flows to service differentiation mechanisms at the customer level and even at the end-user level. The system 100 may be configured to support, but is not limited to supporting, content delivery services, cloud computing services, voice-over-internet protocol services (VoIP), software as a service (SaaS) applications, and any other network services. Additionally, the system 100 may be service agnostic and may be configured to support virtual private networks (VPNs), virtual private LAN service (VPLS), and other related technologies. As shown in FIG. 1, the system 100 may include a client device or end-user device 102, a network provider device 110, a customer device 115, a domain name server 120, a content distribution network 135, a first content distribution server 140, a second content distribution server 145, a third content distribution server 150, a database 155, and a server 160.

The end-user device 102 of the system 100 may be used by an end-user that seeks to access content or other data associated with a particular customer that may be a customer of the content distribution network 135. In one embodiment, the end-user device 102 may be a computer, a server, a mobile device, a smartphone, a computer tablet, or any other computing device. In one embodiment, the end-user device 102 may include a memory 103 that includes instructions, and a processor 104 that executes the instructions from the memory 103 to perform various operations that are performed by the end-user device 102. The processor 104 may be hardware, software, or a combination thereof. The end-user may utilize the end-user device 102 to access a website, online portal, or other resource of a customer of the content distribution network 135 so as to obtain content such as, but not limited to, audio content, video content, text content, image content, web page content, information, data, or any other type of content. In one embodiment, the end-user device 102 may access the content of the customer by transmitting a content request to obtain the content. For example, the content request may be a hypertext transfer protocol (HTTP) GET request, file transfer request (FTP), session initiation protocol (SIP) request, real-time transfer protocol (RTP) request, or any other type of suitable request that may be sent by a software application of the end-user device 102. The software application, for example, may be an internet web browser, an internet client, a mobile device application, or any other type of software application.

The network provider device 110 of the system 100 may be a network device of a network provider of the end-user, the customer, or a combination thereof. Notably, the network provider may provide the end-user and the customer with network access by providing internet backbone access to the Internet and to other networks. Specifically, the network provider may allow the end-user and the customer to access internet services, telephone services, television services, or any other network provider services that are provided by network providers. Additionally, the network provider may also provide the end-user and the customer with varying levels of service based on network provider agreements in place with the end-user and the customer. In one embodiment, the network provider device 110 may include a memory 111 that includes instructions, and a processor 112 that executes the instructions from the memory 111 to perform various operations that are performed by the network provider device 110. The processor 112 may be hardware, software, or a combination thereof. In one embodiment, the network provider device 110 may be a network provider server, a residential gateway, a router, or any other suitable network provider device.

In one embodiment, the network provider device 110 may be utilized by the end-user device 102 to relay content requests to obtain content, receive content from content sources, or to perform a variety of other tasks and functions. In one embodiment, the network provider device 110 may have rules installed therein that indicate a service level to be provided for an end-user, a service level to be provided for a customer of the content distribution network 135, an identification for the end-user, an identification of the customer, an identification of the content distribution network 135, and any other desired information. For example, the rule may indicate a specific quality-of-service (QoS) level for a particular customer, a specific bandwidth level that the customer is entitled to, whether data for the customer should be treated as 800-data, a download rate, an upload rate, a priority level for the customer, whether the customer should have bandwidth cap forgiveness provided by the network provider, a number of users that may access content associated with the customer, a duration for providing network services, or any other type of metric, parameter, or restriction associated with network provider services. In one embodiment, the rules may be adjusted by the devices in the system 100 based on changing conditions, new agreements with the customer or end-user, or for other reasons. The rules may be installed on or otherwise downloaded onto any of the devices in the system 100.

The customer device 115 of the system 100 may be a device associated with a customer of the content distribution network 135. For example, the customer may be a company that generates significant amounts of audio, video, or other content that may be accessed by various end-users through an online website or portal of the customer. The customer may utilize the content distribution network 135 to serve content that is associated with the customer to various end-users that are requesting the content. In one embodiment, all content associated with the customer may be served by the content distribution network 135. In another embodiment, only a portion of the content associated with the customer may be served by the content distribution network 135. In one embodiment, the customer device 115 may include a memory 116 that includes instructions, and a processor 117 that executes the instructions from the memory 115 to perform various operations that are performed by the customer device 115. The processor 117 may be hardware, software, or a combination thereof. In one embodiment, the customer device 115 may be a server, a computer, a router, or any other suitable device.

The domain name server 120 may be utilized by the system 100 to translate a human readable hostname, such as www.contentsource.com or any other hostname, into an internet protocol address. For example, the end-user device 102 may send a request to domain name server 120 to resolve the hostname, www.contentsource.com. In response, the domain name server 120 can provide the end-user device 102 with an internet protocol address that corresponds to the hostname. In one embodiment, the domain name server 120 may provide the internet protocol address from a cache of hostname-internet protocol address pairs or may request the internet protocol address corresponding to the hostname from an authoritative domain name server for the domain to which the hostname belongs. In one embodiment, for example, the internet protocol address returned by the domain name server 120 may be an IPv6 address, such as "2002:0ba4:52a1:1310:2345:5bd5:2340:1234," or any other desired address. In one embodiment, the domain name server 120 may include a memory 121 that includes instructions, and a processor 122 that executes the instructions from the memory 121 to perform various operations that are performed by the domain name server 120. The processor 122 may be hardware, software, or a combination thereof.

The content distribution network 135 of the system 100 may be configured to receive content requests or other requests from end-users for content associated with a customer of the content distribution network 135. In response to the requests, the content distribution network 135 may serve the content to the end-users, such as by utilizing first content distribution server 140, second content distribution server 145, third content distribution server 150, or any combination thereof. In one embodiment, the content distribution network 135 may include any number of additional servers in addition to first content distribution server 140, second content distribution server 145, and third content distribution server 150. The content distribution network 150 may also include and be connected to a wireless network, an ethernet network, a satellite network, a broadband network, a cellular network, a private network, a cable network, the Internet, an internet protocol network, a multiprotocol label switching (MPLS) network, or any combination thereof. In one embodiment, the content distribution network 135 may be part of a single autonomous system that is located in a particular geographic region, or be part of multiple autonomous systems that span several geographic regions.

In one embodiment, the first content distribution server 140 may be in a first geographic region of the content distribution network 135, the second content distribution server 145 may be in a second geographic region of the content distribution network 135, and the third content distribution server 150 may be in a third geographic region of the content distribution network 135. In another embodiment, the first content distribution server 140, the second content distribution server 145, and the third content distribution server 150 may be in the same geographic region. In yet another embodiment, any combination of the first content distribution server 140, the second content distribution server 145, and the third content distribution server 150 may be in any given geographic region. The first content distribution server 140 may include a memory 141 that includes instructions, and a processor 142 that executes the instructions from the memory 141 to perform various operations that are performed by the first content distribution server 140. Additionally, the second content distribution server 145 may include a memory 146 that includes instructions, and a processor 147 that executes the instructions from the memory 146 to perform various operations that are performed by the second content distribution server 145. Furthermore, the third content distribution server 150 may include a memory 151 that includes instructions, and a processor 152 that executes the instructions from the memory 151 to perform various operations that are performed by the third content distribution server 150. The processors 142, 147, and 152 may be hardware, software, or a combination thereof.

The database 155 of the system 100 may be utilized to store information that traverses the system 100, cache content that traverses the system 100, store data about each of the devices in the system 100, and perform any typical functions of a database. In one embodiment, the database 155 may be connected to the content distribution network 155. In one embodiment, the database 155 may be connected to the server 160, the end-user device 102, the network provider device 110, the customer device 115, and the domain name server 120. The database 155 may also store the rules that indicate a service level to be provided for the end-user, a service level to be provided for a customer of the content distribution network 135, an identification for the end-user, an identification of the customer, an identification of the content distribution network 135, and any other desired information.

Operatively, the system 100, as shown in FIG. 1, may be configured to provide differentiated services to traffic flows associated with the content distribution network 135. Initially, an end-user may utilize the end-user device 102 to transmit a request for content that is produced by a particular customer. For example, the request for content may be a request for movie content provided by a customer that has the website, www.moviecontent.com. In order request the content, the end-user may use a browser installed on the end-user device 102 and select a link within the website that is associated with the content. Portions of the customer website may be hosted on the customer device 115, however, other portions of the website may be hosted by the content distribution network 135. For example, the link selected by the end-user may be www.moviecontent.com/movie1, and the content associated with this link may be hosted by the content distribution network 135. When the end-user selects the link, the domain name server 120 may translate the human readable hostname into the actual internet protocol address that is associated with the link. For example, the domain name server 120 may return an internet protocol address for one of the content distribution servers 140, 145, or 150 based on the end-user's location, based on network utilization, or based on other factors.

Once the link is selected and the internet protocol address is resolved, an HTTP GET request or other similar request may be utilized to request the content from the customer. The content request, for example, may be sent to first content distribution server 140, which may check its own cache for the content. If the requested content is available in the cache of the first content distribution server 140, the first content distribution server 140 may transmit the content in a traffic flow to the end-user device 102, such as via the network provider server 110. If the requested content is not available in the cache of the first content distribution server 140, then the first content distribution server 140 may obtain the requested content from second content distribution server 145, third content distribution server 150, or from any other server associated with the content distribution network 135 that has the requested content.

Figure 2:
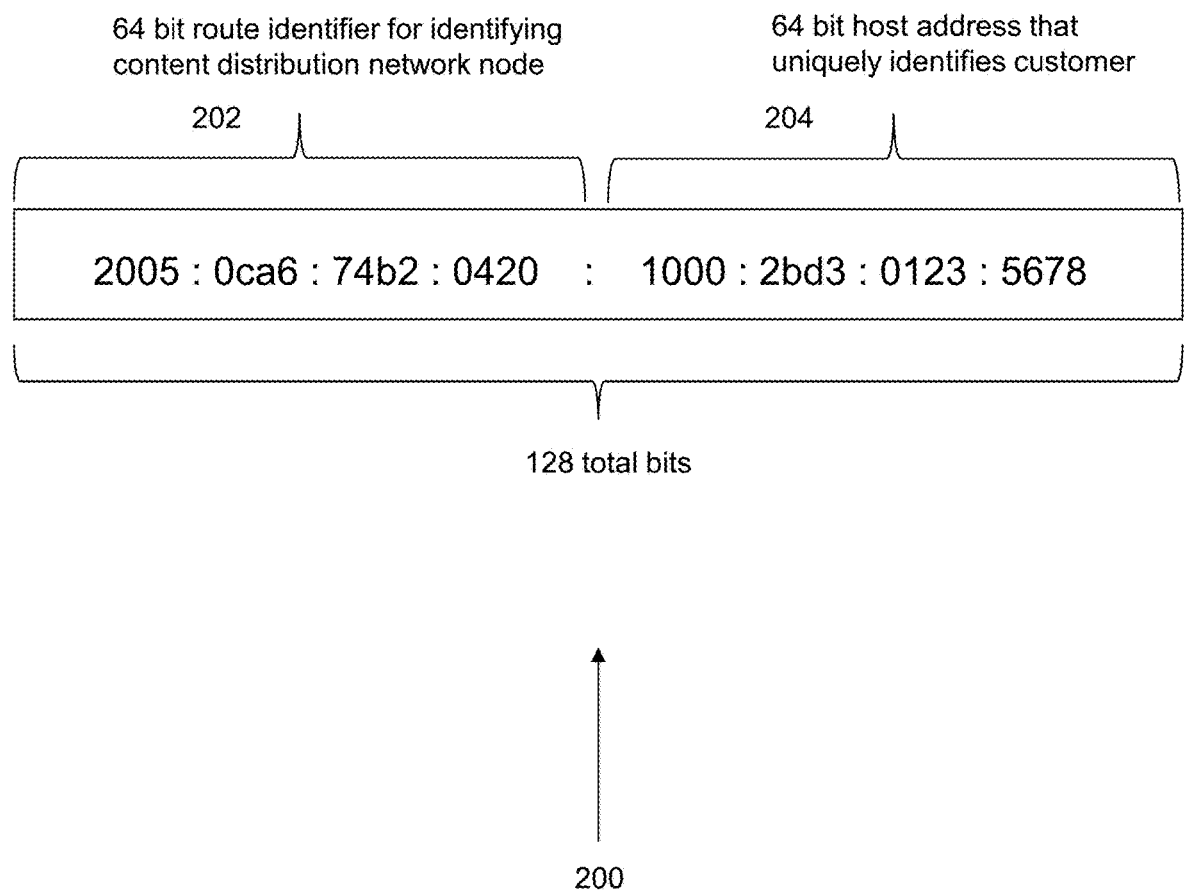
FIG. 2 is a schematic diagram illustrating a sample portion of an IPv6 address including a first portion that includes a route identifier for identifying a node in a content distribution network and a second portion that uniquely identifies a customer of the content distribution network.

Notably, the network provider may have agreements in place with the cooperation of the content distribution network 135 such that a property of IPv6 addressing or addressing schemes may be leveraged by the system 100 to provide differentiated services to traffic flows coming from the content distribution network 135. The property that may be leveraged is that the internet protocol address in IPv6 addressing or some other similar addressing scheme is composed of two parts: a route and a host. The route portion may be configured according to the present disclosure to represent a route identifier that uniquely identifies a device, such as a server or node, in the content distribution network 135 from other devices in the content distribution network. For example, each content distribution server 140, 145, and 150 may be uniquely distinguished from one another based on a unique route identifier that is assigned in a first portion of the internet protocol address. Referring now also to FIG. 2, the route identifier in the first portion 202 of the internet protocol address 200 that is associated with the first content distribution server 140 may be "2005:0ca6:74b2:0420." In one embodiment, the first portion 202 of the internet protocol address 200 may be 64 bits in length and the internet protocol address may be 128 bits in length, however, other sizes are also contemplated according to the present disclosure. The second content distribution server 145 and the third content distribution server 150 may also have unique route identifiers that uniquely identify them as well.

The host portion/second portion 204 of the internet protocol address 200 may be configured to include a unique host address or host identifier within the first content distribution server 140 that uniquely identifies the customer as a customer of the content distribution network 135, and also uniquely identifies the customer from other customers of the content distribution network 135. For example, in FIG. 2, the customer, www.moviecontent.com, may be uniquely represented by the unique host address "1000:2bd3:0123:5678," and this unique host address may be included in the second portion 204 of the internet protocol address 200. In one embodiment, the second portion 204 of the internet protocol address may be 64 bits in length, however, other sizes are also contemplated. In one embodiment, whenever a customer becomes a customer of the content distribution network 135, a unique host address may be assigned to the customer, and this information may be relayed to any of the devices in the system 100. In one embodiment, the unique route identifiers, unique host addresses, customer information, and rules associated with the customers may be downloaded onto the network provider device 110, the content distribution servers 140, 145, and 150, or on any other device in the system 100.

When the first content distribution server 140 begins to transmit the traffic flow including the content that is destined for the end-user device 102 that requested the content, the traffic flow may pass to the network provider device 110 of the network provider of the end-user. The network provider device 110 may determine the internet protocol address from which the traffic flow was sent when the traffic flow passes to the network provider device 110. Then, the network provider device 110 may analyze a first portion of the internet protocol address to determine the route identifier. Once the route identifier in the first portion is determined, the network provider device 110 may determine if the route identifier included in the first portion is contained in a set of valid prefixes for the content distribution network 135. In one embodiment, the set of valid prefixes may be stored in an access control list, in another list, or in a file on the network provider device 110 or other device of the system 100. If the route identifier is not in a set of prefixes that are known to be associated with the content distribution network 135, the network provider device 110 may treat the traffic in a routine manner and forward the traffic to the end-user device 102.

If, however, the route identifier is in the set of prefixes that are known to be associated with the content distribution network 135 (e.g. the first portion matches the route identifier/prefix "2005:0ca6:74b2:0420" for the first content distribution server 140), the network provider device 110 may analyze the second portion of the internet protocol address to determine if the second portion matches a unique host address for a customer of the content distribution network 135. In one embodiment, the list of unique host addresses associated with customers of the content distribution network 135 may be stored in an access control list, in another list, or in a file on the network provider server 110 or other device of the system 100. Continuing with the above example, the network provider device 110 may determine if the second portion matches the unique host address for the www.moviecontent.com customer, which in this example is "1000:2bd3:0123:5678." If the second portion does not match a unique host address for a customer of the content distribution network 135, the network provider device 110 may treat the traffic flow in a routine manner. In some embodiments, if the second portion does not match a unique host address for a customer of the content distribution network 135, the network provider device 110 may provide a reduced level of network resources to the traffic flow, which may be considered "a non-content distribution network customer level of service."

If, however, the second portion does match the unique host address for a customer of the content distribution network 135, the network provider device 110 may determine if a rule exists for the customer. For example, the network provider device 110 may determine from a rule installed on the network provider device 110 that the customer, www.moviecontent.com, is entitled to differentiated services. The rule, for example, may indicate that traffic flows associated with www.moviecontent.com should be entitled to bandwidth cap forgiveness and that the traffic flows should be entitled to a QoS that ensures that the content is delivered in high definition. As a result, the network provider device 110 can ensure that the traffic flow for this customer receives these differentiated services, irrespective of the end-user device 102 that requests and receives the content. Notably, this may be performed by the system 100 without the need for scanning the content of the packets of the traffic flow, without monitoring the length of the traffic flow, without the use of DPI devices, and without having to link the actual content request with the traffic flow that is sent in response to the request. In one embodiment, the operations utilized to link a particular traffic flow to a particular differentiated service may fall into the order of complexity of a typical router access control (ACL) list. In one embodiment, the determinations relating to the first portion of the internet protocol address, the determinations relating to the second portion of the internet protocol address, and the determinations relating to the rule may be performed simultaneously, approximately at the same time, or in any desired sequence.

In one embodiment, the system 100 may also provide differentiated services not only at the customer level, but also at the end-user level. For example, in addition to the rules associated with the customer, rules associated with the end-user may also be utilized. The rules may include indications of differentiated services relating to a specific quality-of-service (QoS) level for a particular end-user, a specific bandwidth level that the end-user is entitled to, whether data for the end-user should be treated as 800-data, a download rate for the end-user, an upload rate for the end-user, a priority level for the end-user, a charge associated with the end-user, whether the end-user should have bandwidth cap forgiveness, a duration for providing network services to the end-user, or any other type of metric, parameter, or restriction associated with network provider services for the end-user that may be specified by the network provider, the content distribution network 135, or a combination thereof. These additional rules may be installed on or otherwise downloaded onto any of the devices in the system 100.

When the end-user device 102 sends a request for content associated with a customer of the content distribution network 135, the content distribution network 135 may send a traffic flow including the content to the end-user by way of the network provider server 110. As the traffic flow including the requested content passes to the network provider server 110, the network provider server 110 may determine if a first portion of the internet protocol address associated with the traffic flow includes a route identifier for a node or server of the content distribution network 135 and if a second portion of the internet protocol address matches a unique host address specified for the customer of the content distribution network 135. In addition to making these determinations, the network provider server 110 or other suitable device in the system 100 may also determine an identifier for the end-user that the traffic flow is supposed to be sent to. The identifier may be an internet protocol address for the end-user device 102 or any other identifier that uniquely identifies the end-user. In one embodiment, the identifier for the end-user may be determined based on an examination of one or more packets in the traffic flow. In one embodiment, the examination utilized to identify the identifier for the end-user may include examining a destination address provided in the one or more packets. If there is a rule for the end-user that includes an identifier that matches the determined identifier, then the network provider server 110 may provide differentiated services to the end-user based on the services specified in the rule. In one embodiment, the providing of differentiated services to the end-user based on the services specified in the rule may occur without having to monitor the end-user's request for content.

In one embodiment, the system 100 may also be utilized in additional scenarios. For example, hosting providers or content distribution networks 135 typically host many websites on the same internet protocol address of a particular hosting provider device, such as first content distribution server 140. These multiple websites may typically only be differentiated from one another by their uniform resource locator (URL). If one of the websites that is hosted by the hosting provider is placed onto a proxy blacklist based on malicious or suspicious activity associated with that one website, then all of the websites hosted by the hosting provider that share the same internet protocol address as the one malicious website will be blocked from access by end-users or others. However, by using the system 100, a first portion of the internet protocol address may be configured to be assigned to identify the hosting provider device (e.g. content distribution server), and a second portion of the internet protocol address may be assigned to indicate a hosting identifier of a virtual server running on the host. The hosting identifier, for example, may uniquely identify each website running on the hosting provider. In this way, the system 100 may blacklist only the malicious website without having to blacklist other websites running on the same physical machine of the hosting provider. Furthermore, rules may be utilized in this context to enable the provisioning of differentiated services to different websites even if they are running on the same hosting provider machine.

Notably, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, determining if a first portion of an internet protocol address identifies a node or other device in the content distribution network 135, determining if a second portion of the internet protocol address matches a unique host address that uniquely identifies a customer of the content distribution network, providing differentiated services for traffic flows associated with the customer based on rules, and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including an end-user device 102, a network provider device 110, a customer device 115, a domain name server 120, a content distribution network 135, a first content distribution server 140, a second content distribution server 145, a third content distribution server 150, a database 155, and a server 160. However, the system 100 may include multiple end-user devices 102, multiple network provider devices 110, multiple customer devices 115, multiple domain name servers 120, multiple content distribution networks 135, or any number of any of the other components in the system 100. Furthermore, in one embodiment, substantial portions of the functionality of the system 100 may be performed by network provider device 110.

Figure 3:
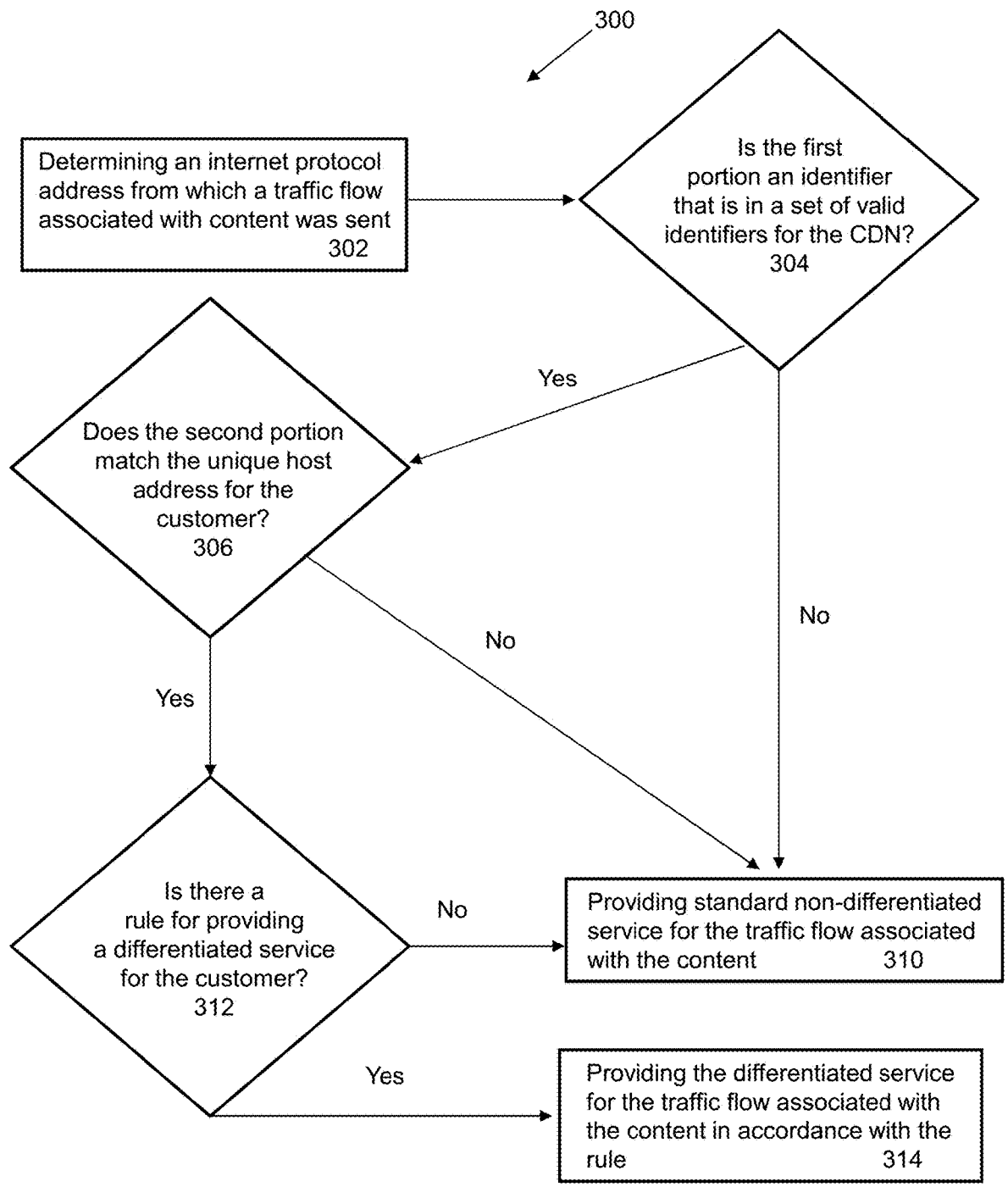
FIG. 3 is a flow diagram illustrating a sample method for providing differentiated services to traffic flows of a content distribution network according to an embodiment of the present disclosure.

As shown in FIG. 3, an exemplary method 300 for providing differentiated services to traffic flows of a content distribution network 135 is schematically illustrated. The method 300 may include, at step 302, determining an internet protocol address from which a traffic flow associated with a request for content was sent. In one embodiment, the determination of the internet protocol address may be performed with the assistance of the network provider device 110, the domain name server 120, any combination thereof, or other appropriate device. At step 304, the method 300 may include determining if a first portion of the internet protocol address includes a route identifier that identifies a content distribution server, node, or other device of the content distribution network 135. The determination may include determining if the first portion of the internet protocol address is in a set of valid prefixes or identifiers for the content distribution network 135. In one embodiment, the determination for the first portion may be made by comparing the first portion to a list or table including the set of valid prefixes for the content distribution network 135. In one embodiment, the determination of whether the first portion of the internet protocol address includes the route identifier may be performed by the network provider device 110, the domain name server 120, any combination thereof, or other appropriate device.

At step 306, the method 300 may include determining if a second portion of the address matches a unique host address that uniquely identifies a customer of the content distribution network 135. The determination may involve comparing the second portion of the address to a list or table including a set of host addresses associated with customers of the content distribution network 135 and identifying a match. In one embodiment, the determination of whether the second portion of the address matches a unique host address that uniquely identifies the customer may be performed by the network provider device 110, the domain name server 120, any combination thereof, or other appropriate device. In one embodiment, steps 304 and 306 may be combined into a single step, performed simultaneously, performed at substantially the same time, or in any sequence. If the first portion of the internet protocol address is not in the set of valid prefixes or identifiers for the content distribution network 135, and/or the second portion does not match the unique host address for a customer of the content distribution network 135, the method 300 may include providing standard network services to the traffic flow associated with the content at step 310. In one embodiment, the standard network services may be provided by the network provider device 110 or any other device associated with the network provider that assist with the handling of the traffic flow including the content.

If, however, the first portion of the internet protocol address is determined to be in the set of valid prefixes or identifiers for the content distribution network 135 and the second portion does match the unique host address for a customer of the content distribution network 135, the method 300 may include, at step 312, determining if there is a rule for providing a differentiated service for the customer of the content distribution network 135 that is associated with the traffic flow. The determination may be made by examining rules installed or otherwise downloaded onto the devices in the system 100. In one embodiment, the determination of the existence of the rule may be performed by the network provider device 110, the content distribution servers 140, 145, and 150, any combination thereof, or other appropriate device. In one embodiment, steps 304, 306, and 312 may be combined into a single step, performed simultaneously, performed at substantially the same time, or in any sequence. If there is no rule for providing a differentiated service to the customer, then the method 300 may include going to step 310, which involves providing standard network services for the traffic flow associated with the content. If, however, there is a rule for providing a differentiated service to the customer, then the method 300 may include providing the differentiated service for the traffic flow associated with the content in accordance with the rule. In one embodiment, the differentiated service may be provided by the network provider device 110, the content distribution servers 140, 145, and 150, any combination thereof, or other appropriate device.

In one embodiment, the system 100 and methods described herein may provide differentiated services not only at the customer level, but also at the end-user level. For example, additional rules that indicate differentiated services including a specific quality-of-service (QoS) level for a particular end-user, a specific bandwidth level that the end-user is entitled to, whether data for the end-user should be treated as 800-data, a charge associated with the end-user, whether the end-user should have bandwidth cap forgiveness, a priority level, an upload rate, a download rate, a duration for providing network services to the end-user, or any other type of metric, parameter, or restriction associated with network provider services for the end-user may be specified by the network provider, the content distribution network 135, or a combination thereof. These additional rules may be installed on or otherwise downloaded onto any of the devices in the system 100.

When an end-user sends a request for content associated with a customer of the content distribution network 135, the content distribution network 135 may send a traffic flow including the content to the end-user by way of the network provider server 110. As the traffic flow including the requested content passes to the network provider server 110, the network provider server 110 may determine if a first portion of the internet protocol address includes a route identifier for a node or server of the content distribution network 135 and if a second portion of the internet protocol address matches a unique host address specified for the customer of the content distribution network 135. The network provider server 110 or other suitable device in the system 100 may also determine an identifier for the end-user associated with traffic flow. The identifier, for example, may be an internet protocol address for the end-user or any other identifier that uniquely identifies the end-user. In one embodiment, the identifier for the end-user may be determined based on an examination of one or more packets in the traffic flow. In one embodiment, the examination to identify the identifier for the end-user may include examining a destination address provided in the one or more packets. If there is a rule for the end-user that includes an identifier that matches the determined identifier, then the network provider server 110 may provide differentiated services to the end-user based on the services specified in the rule.

In one embodiment, the system 100 and methods described herein may also extend to other applications. For example, in the internet security space, a hosting provider may typically host many websites, which are only differentiated by their uniform resource locator (URL), on the same internet protocol address that is associated with a particular hosting provider device. If one of the websites that is hosted by the hosting provider is placed onto a proxy blacklist or other type of blacklist based on malicious activity associated with that one website, then all of the websites hosted by the hosting provider that share the same internet protocol address as the one malicious website will typically be blocked by the provider. However, by using the system 100 and the methods herein, a first portion of the internet protocol address may be configured to be assigned to identify the hosting provider device, and a second portion of the internet protocol address may be assigned to indicate a hosting identifier of a virtual server running on the host. The hosting identifier, for example, may uniquely identify each website running on the hosting provider. In this way, the system 100 may blacklist only the problematic malicious website without having to blacklist other websites running on the same physical machine of the hosting provider. Furthermore, rules may be utilized in this context to enable the provisioning of differentiated services to different websites even if they are running on the same hosting provider machine. In one embodiment, the system 100 and methods described herein may further include utilizing any of the various components described in the system 100 to perform the operative functions disclosed herein.

It is important to note that the methods described above may incorporate any of the functionality, devices, and/or features of the system 100 and subsystems described above, or otherwise, and are not intended to be limited to the description or examples provided herein.

Figure 4:
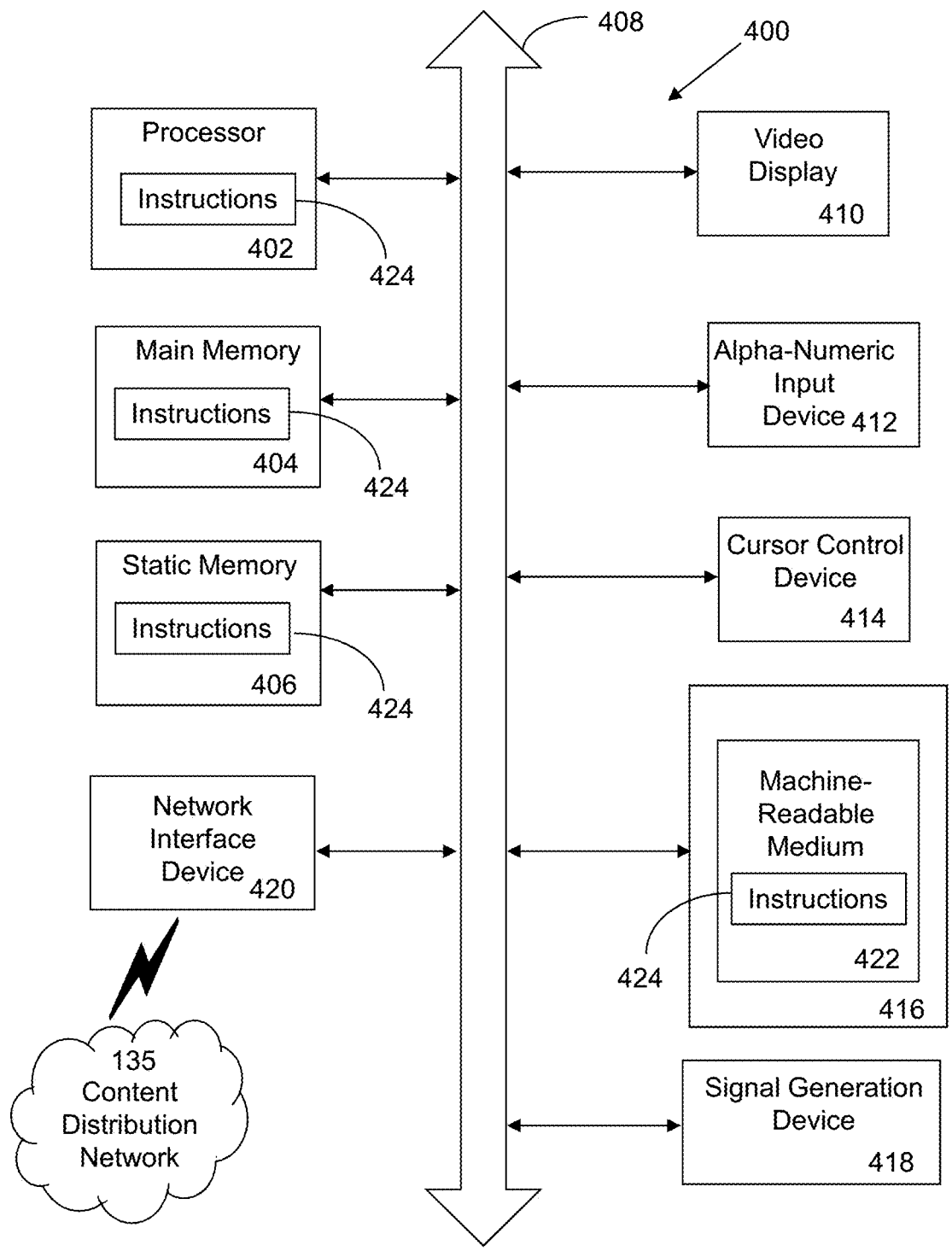
FIG. 4 is a schematic diagram of a machine in the form of a computer system within which a set of instructions, when executed, may cause the machine to perform any one or more of the methodologies or operations of the systems and methods for providing differentiated services to traffic flows of a content distribution network.

Referring now also to FIG. 4, at least a portion of the methodologies and techniques described with respect to the exemplary embodiments of the system 100 can incorporate a machine, such as, but not limited to, computer system 400, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a stand-alone device. In some embodiments, the machine may be connected (e.g., using content distribution network 135, another network, or a combination thereof) to and assist with operations performed by other machines, such as, but not limited to, the end-user device 102, the network provider device 110, the customer device 115, the domain name server 120, the first content distribution server 140, the second content distribution server 145, the third content distribution server 150, the database 155, the server 160, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 404, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions 424 (e.g., software) embodying any one or more of the methodologies or functions described herein, including those methods illustrated above. The instructions 424 may also reside, completely or at least partially, within the main memory 404, the static memory 406, or within the processor 402, or a combination thereof, during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium 422 containing instructions 424 so that a device connected to the content distribution network 135, other network, or both, can send or receive voice, video or data, and to communicate over the content distribution network 135, other network, or both, using the instructions. The instructions 424 may further be transmitted or received over the content distribution network 135, other network, or both, via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The terms "machine-readable medium" or "machine-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium" or "machine-readable device" may be non-transitory. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
a memory that stores instructions;
a processor that executes the instructions to perform operations, the operations comprising:
determining if a portion of an internet protocol address matches a unique host address specified by a network for a customer of the network; and
providing, if the portion of the internet protocol address matches the unique host address, if a different portion of the internet protocol address is in a set of prefixes of the network, and if a rule exists for providing a differentiated service for the customer, the differentiated service for a traffic flow associated with the internet protocol address.

2. The system of claim 1, wherein the operations further comprise determining if the portion of the internet protocol address includes a route identifier that identifies a node in a content distribution network that provides content.

3. The system of claim 1, wherein the operations further comprise providing non-differentiated service for the traffic flow if the portion of the internet protocol address does not match the unique host address specified by the network for the customer of the network.

4. The system of claim 1, wherein the operations further comprise determining if the portion of the internet protocol address matches the unique host address by comparing the portion of the internet protocol address to a list including a set of host addresses associated with customers of the network.

5. The system of claim 1, wherein the operations further comprise providing non-differentiated service for the traffic flow if the different portion of the internet protocol address is not in the set of prefixes of the network.

6. The system of claim 1, wherein the operations further comprise adjusting the rule to provide a different differentiated service for the traffic flow.

7. The system of claim 1, wherein the operations further comprise receiving a request for content.

8. The system of claim 7, wherein the operations further comprise providing, in response to the request for the content, the content with the traffic flow.

9. The system of claim 1, wherein the operations further comprise providing non-differentiated service for the traffic flow if the rule does not exist.

10. The system of claim 1, wherein the operations further comprise determining an identifier for an end-user by examining the traffic flow.

11. The system of claim 1, wherein the operations further comprise determining a service level to be utilized for the traffic flow based on the rule.

12. The system of claim 1, wherein the operations further comprise downloading the rule to a device associated with the customer of the network.

13. A method, comprising:
determining, by utilizing instructions from a memory that are executed by a processor, if a portion of an internet protocol address is in a set of prefixes of a network; and
providing, if the portion of the internet protocol address is in the set of prefixes of the network, if a different portion of the internet protocol address matches a unique host address specified by the network for a customer of the network, and if a rule exists for providing a differentiated service for the customer, the differentiated service for a traffic flow associated with the internet protocol address.

14. The method of claim 13, further comprising determining if the different portion of the internet protocol address matches the unique host address specified by the network for the customer of the network.

15. The method of claim 13, further comprising providing non-differentiated service for the traffic flow if the different portion of the internet protocol address does not match the unique host address specified by the network for the customer of the network.

16. The method of claim 13, further comprising providing non-differentiated service for the traffic flow if the portion of the internet protocol address is not in the set of prefixes of the network.

17. The method of claim 13, further comprising determining a service level to be utilized for the traffic flow based on the rule.

18. The method of claim 13, further comprising downloading the rule to a device associated with the customer of the network.

19. The method of claim 13, further comprising providing non-differentiated service for the traffic flow if the rule does not exist.

20. A computer-readable device comprising instructions, which when loaded and executed by a processor, cause the processor to perform operations comprising:

determining if a portion of an internet protocol address matches a unique host address specified by a network for a customer of the network; and providing, if the portion of the internet protocol address matches the unique host address, if a different portion of the internet protocol address is in a set of prefixes of the network, and if a rule exists for providing a differentiated service for the customer, the differentiated service for a traffic flow associated with the internet protocol address.

\* \* \* \* \*